Aug. 8, 1967 W. H. JAYE 3,334,419

METROLOGICAL APPARATUS

Filed Oct. 15, 1963

INVENTOR
WILLIAM HENRY JAYE
BY
Kane and Nydick
ATTORNEYS

United States Patent Office 3,334,419
Patented Aug. 8, 1967

3,334,419
METROLOGICAL APPARATUS
William Henry Jaye, Aspley Heath, Bletchley, England, assignor to Sogenique (Service) Limited
Filed Oct. 15, 1963, Ser. No. 316,295
Claims priority, application Great Britain, Oct. 18, 1962, 39,437/62
8 Claims. (Cl. 33—143)

ABSTRACT OF THE DISCLOSURE

A reference member such as a scale is mounted on a support for an article to be measured, such as an engineer's slip gauge (gauge block). A cursor contacts the article and cooperates with the reference member to signal or indicate the length of the article. The cursor includes two parallel members so connected and of such thermal expansion coefficients that the net length of the cursor is temperature compensated. The support is individually temperature compensated, and the reference member is chosen to have the same thermal expansion coefficient as the article.

---

Figure 1:
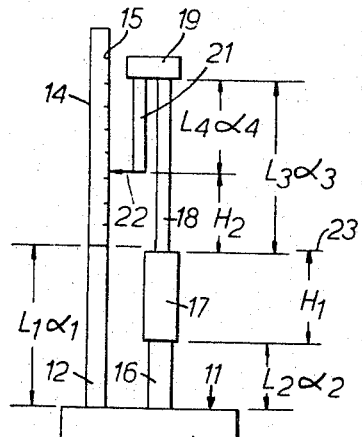

This invention relates to metrological apparatus, for the measurement to a high order of accuracy of the linear dimensions of an object. The invention is primarily directed to the provision of an apparatus for checking engineers' slip gauges (gauge blocks), though the invention can be applied in other circumstances where a high order of measuring accuracy is required.

At the present time slip gauges are usually checked either by a comparison system, or by an interferometric method. The comparison method can be carried out only if there are available slip gauges of known accuracy, the accuracy being not less than that of the gauges being checked, and the interferometric method, though an absolute method is very slow to carry out, and requires a high degree of skill if the desired accuracy is to be obtained. It is a method more appropriate to laboratory testing than to the routine checking of slip gauges.

The present invention is directed to an apparatus for the direct measurement of slip gauges, especially those of the order of a few inches in length, though the principles of the invention can be applied to slip gauges of greater dimensions.

The length of a slip gauge is required to be known to a high degree of accuracy; a practical figure is that the length should be known to an accuracy of $(3+L/2)$ microinches, where L is the length of the gauge in inches. Thus, an apparatus for measuring a slip gauge must have an accuracy of appreciably better than 3 microinches, and preferably an accuracy of one microinch or better. A second and very difficult problem arising in the design of an apparatus for the absolute measurement of slip gauges is that which concerns temperature. The dimensions of any metrological structure will vary with temperature, and such variations of dimension may very easily exceed the required accuracy of measurement. It is possible to calibrate an apparatus for use at a specified temperature, but this is not a very satisfactory solution partly because of the inconvenience of bringing both the apparatus and the slip gauge to be measured to the specified temperature, but also because it may be a matter of practical difficulty to ensure that all the parts of the apparatus are at the same temperature at the time the measurement is made. It is scarcely possible to hold all the component parts of a structure at exactly the same temperature due to convection currents within the structure and to different absorptive and reflective properties of the surfaces of the component parts. Quite small differences of temperature produced in this way can destroy the accuracy of the apparatus.

The present invention concerns an apparatus in which the effects of temperature are substantially reduced, enabling the apparatus to be used over a predetermined temperature range without loss of accuracy.

The present invention provides a metrological apparatus, particularly for slip gauges, including a reference member mounted on a first support, a second support for the article to be measured and a cursor or other movable measuring element for relating the length of the article being measured to the reference element. The coefficient of thermal expansion of the reference element is chosen to be substantially the same as that of the article being measured. The variations with temperature of the lengths of the first and second supports are chosen to be the same. The variation with temperature of the measuring length of the measuring element is chosen to be substantially zero.

By the term "measuring length of the measuring element" is meant the distance parallel to the length of the reference element between the position where the measuring element engages the article being measured, and the position where the measuring element cooperates with the reference element to indicate the article's length.

Figure 2:
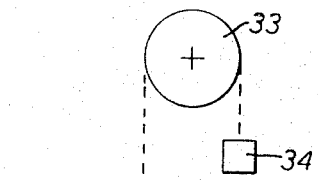
Figure 2:
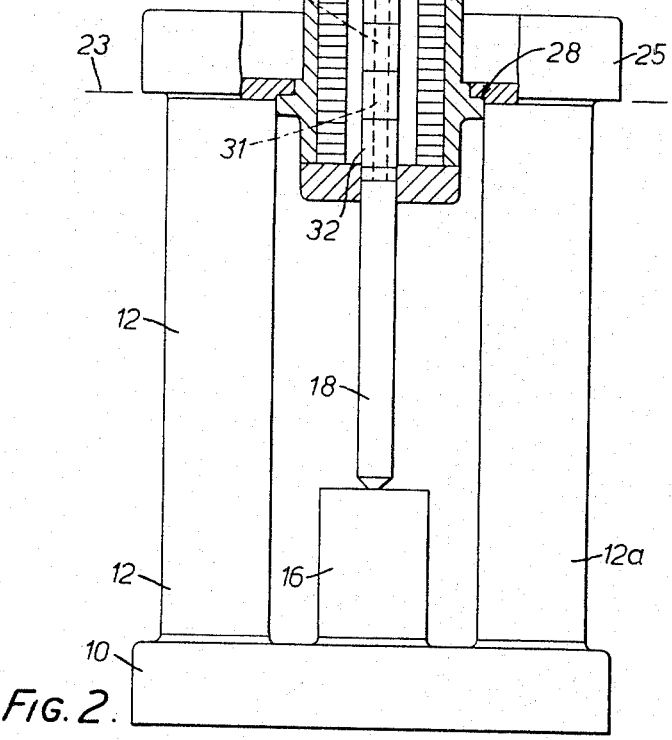

Further features and advantages of the invention will appear from the following description of this preferred embodiment of the invention, in conjunction with the accompanying drawings, in which:

FIGURE 1 is a diagram showing the fundamental parts of the system, and
FIGURE 2 is a partly diagrammatic side elevation of this embodiment.

In this embodiment, the two measuring branches described are arranged vertically. A base 10 is provided, the upper surface 11 of which forms a datum. A support 12 extends from the datum 11, the support having length $L_1$ and a temperature coefficient of $\alpha 1$. Support 12 carries a member 14 which is one of two members forming the measuring means of the system, and is shown diagrammatically as carrying a scale 15. Also extending from datum 11 is a further support 16, upon which the slip gauge 17 to be measured is located. The second member of the measuring means is a composite one comprising what can be described as a probe portion 18 supported from a member 19, and a second probe member 21 also supported from member 19. The support 16 has a length $L_2$ and a coefficient of expansion $\alpha 2$; member 18 has a length $L_3$ and the coefficient of expansion $\alpha 3$ and member 21 has a length $L_4$ and coefficient of expansion $\alpha 4$. The end of probe member 21 is used as an index, as indicated diagrammatically at 22.

Certain relationships in addition to the above-noted equality of coefficients of expansion of object and scale portion exist between the lengths and coefficients of expansion of the members 12, 14, 16, 18, and 21. Firstly, it is arranged that the length $L_1$ is equal to the expression $(L_2+L_3-L_4)$. In effect this means that when there is no slip gauge 17 in position between the parts 16 and 18, so that the adjacent surfaces of these two parts are in contact, the index mark 22 will coincide with the zero mark on the member 14, at the junction of members 12 and 14, at the line 23. Secondly, it is arranged that the product $L_1\alpha 1$ is equal to the product $L_2\alpha 2$. The effect of this is that the two members 12 and 16 are compensated, the actual expansions that take place in both of the members for a given temperature rise being the same, as a result of which the height H1 between the top of the member 16 and the line 23 will be independent of temperature. Also, in the same way, the product $L_3\alpha 3$ is made equal to the product $L_4\alpha 4$, so that the height $H_2$ between the index mark 22 and the bottom of member 18 is also made independent of temperature.

It will be seen that as a result of these relationships, the one branch will include the slip gauge 17 under measurements as one of its elements, and this obviously will be subject to expansion with temperature. It is therefore arranged that the member 14 is made of a material having the same coefficient of expansion as the slip gauge; there is sufficient uniformity in the type of material used for slip gauges for this coefficient to be regarded as reasonably constant for a variety of slip gauges. It will be seen that with the slip gauge in position, the length of the member 14 that can be included in the measuring system is precisely the same as the length of the slip gauge under test and as these two parts are of the same coefficient of expansion it means that the two branches of the measuring system have the same response to temperature.

In consequence, the problem of temperature insensitivity of the system reduces to the problem merely of keeping the various parts at substantially the same temperature and this is a far less difficult problem to solve than that of maintaining the whole apparatus, not only at the same temperature but at a very closely controlled one.

FIGURE 2 shows, partly diagrammatically, a practical form of the invention. The measuring means adopted in this construction is of the kind comprising a series of electrically discrete elements, arranged side by side to form a line, the elements being separately energizable from points upon a potential divider system supplied with high frequency current. By this means there is produced along the length of the line of the elements a progressive high frequency voltage. The other member of the measuring means comprises a pickup electrode, conveniently with guard electrodes on each side, the voltage on the pickup electrode being accordingly a function of the pick up position of the electrode with respect to the line of elements. A measuring means of this kind is described in more detail in Patent 3,071,758 issued on Jan. 1, 1963 to Caleb Frederick Wolfendale, to which attention is directed. In the present embodiment the line of elements is formed as a cylinder within which the other member of the measuring means moves.

In FIGURE 2, parts corresponding to those indicated in FIGURE 1 bear like reference numerals. In FIGURE 2 the base 10 carries two side support members 12 and 12a, this arrangement being adopted for greater mechanical stability. Also, the side members are joined by a cross head 25 from which the measuring means is supported. The member 16 is secured to base 10, and the upper surface of this member may be shaped in the conventional manner, as for instance by having a central spherical portion of prescribed radius, for use as a reference surface.

The measuring means in this case comprises an outer sleeve 26, supporting a stack of annular electrode elements 27, the sleeve 26 having a datum shoulder 28 which bears against a datum surface on the underside of crosshead 25, corresponding to the line 23 in FIGURE 1. The probe member comprises the element 18, a guard element 30, a pick-off electrode 31, and a further guard element 32. The upper part of the probe structure is indicated as the element 19, and in the manner described with reference to FIGURE 1, with the probe element 18 resting upon the member 16, the central line of the pick-off electrode 31 falls on the line 23. The thermal coefficients and lengths of the elements 12, 14, 16, 26, 27, 30 and 31 and the element 18 are related in the manner described in connection with FIGURE 1 with reference to elements 12, 14, 16, 18 and 21 of that figure. The height of the datum surface of the underside of crosshead 25 above the horizontal plane passing through the bottoms of pillars 12, 16, 12a corresponds to the length $L_1$ in FIG. 1. In order to secure an appropriate contact pressure between the probe element 18 and the slip gauge which is inserted between that member and the member 16, the system can be counterpoised by means indicated diagrammatically as pulley 33 and weight 34.

Steel is suitable for the elements 27, but must have the same coefficient of expansion as the material used for slip gauges, also in the manner described above.

In this way, the apparatus so far described can be made to be independent of temperature over a useful working range, provided that the slip gauge and the apparatus are at a substantially uniform temperature. For this reason the apparatus may be mounted in a suitable cabinet, and it will normally be that such an apparatus will be used in surroundings where large temperature variations are not likely to be encountered. To reduce temperature differentials in the apparatus, due to convection currents or heat radiation or absorption, the two main supports 12 and 12a are given the same finish, preferably by grinding to a bright, non-radiating surface. The base 10 can be of cast iron, exposed surfaces of which are finished in a uniform white reflecting paint. The upper ends of the members 12 and 12a which are fixed to the crosshead 25 should ideally present to the air a section similar to the central member 16 which bears the slip gauge. This can be done by leaving the appropriate proportion of the upper surface of the two members 12 and 12a exposed to the air and arranging the attachment of the crosshead to correspond in area to that of a slip gauge. The crosshead is also made of cast iron and painted the same colour as the base. The cabinet itself can be made of a double skin construction, for example of aluminium castings or of fibre glass, with an appropriate handling window.

I claim:

1. Apparatus for measuring a selected length of an object having a known coefficient of thermal expansion, said apparatus comprising a base member defining a fixed plane of support, a first support structure extending from said plane, an elongate reference element supported by said first support structure, a second support structure extending from said plane, said second support structure being arranged to support the object to be measured in a position in which said length of the object is substantially parallel to the length of said reference element, and a movable measuring element for cooperating with said reference element to indicate said length of the object, the coefficient of thermal expansion of said reference element being chosen to be substantially the same as that of the object to be measured, the variation with temperature of the length of said first support structure being selected so that it is substantially the same as that of said second support structure, and the variation with temperature of the measuring length of said measuring element being selected so that it is substantially zero.

2. Apparatus according to claim 1, wherein said base has its exposed surfaces finished in a uniform white reflecting paint.

3. Apparatus according to claim 1, wherein said measuring element comprises a first elongate probe portion for contacting said object when supported by the second support structure at an end portion opposite to its supported end, a second elongate probe portion for cooperating with said reference element, both said probe portions extending in a direction parallel to the length of said reference element, and a common movable support member supporting both said probe portions, the product of the length of the first probe portion and its coefficient of thermal expansion being made substantially equal to the product of the length of the second probe portion and its coefficient of thermal expansion.

4. Apparatus according to claim 3, wherein the length of said first support structure is substantially equal to the sum of the length of said second support structure and the measuring length of said measuring element.

5. Apparatus according to claim 1, wherein said reference element comprises a series of electrically discrete elements arranged side by side to form a line, said elements being separately, energizable to provide a progressive high frequency along the line of elements.

6. Apparatus according to claim 5, wherein said elements are provided by a stack of annular electrodes.

7. Apparatus according to claim 5, wherein said first support structure comprises a pair of vertical columns located on said base and a member bridging said columns, said line of elements being attached to the bridging member; and wherein also said second support structure comprises a vertical column located on said base, at least the upper ends of the columns of the first and second structures presenting to the air similar cross sections.

8. Apparatus according to claim 5, wherein said measuring element comprises a first probe portion for contacting said object, a second probe portion including a pick-off electrode capacitively coupled with said line of elements so that the voltage on the pick-off electrode is a function of the position of the pick-off electrode with respect to said line of elements, and a common movable support member for supporting said first and second probe portions, the variation with temperature of the length of said first probe portion being substantially the same as that of said second probe portion.

References Cited

UNITED STATES PATENTS

| | | | |
|---|---|---|---|
| 2,421,933 | 6/1947 | Goldstine | 33—147 |
| 2,510,822 | 6/1950 | Jacot et al. | 33—147 |
| 2,611,964 | 9/1952 | Buisson | 33—147 |
| 2,670,542 | 3/1954 | Hull | 33—169 |
| 2,717,449 | 9/1955 | Graham | 33—147 |
| 2,996,806 | 8/1961 | Zieher | 33—143 |
| 3,071,758 | 1/1963 | Wolfendale | 340—187 |

FOREIGN PATENTS

| | | |
|---|---|---|
| 1,183,827 | 2/1959 | France. |

OTHER REFERENCES

"Physics," Oscar M. Stewart, published 1931, by Ginn & Co., New York and London, 770 pages, page 228 relied on.

"Industrial Inspection Methods," Leno C. Michelon, published 1950, by Harper & Brothers, New York, 566 pages, page 139 relied on.

ROBERT B. HULL, *Primary Examiner.*